US006782377B2

(12) United States Patent  
Agarwal et al.

(10) Patent No.: US 6,782,377 B2  
(45) Date of Patent: Aug. 24, 2004

(54) METHOD FOR BUILDING CLASSIFIER MODELS FOR EVENT CLASSES VIA PHASED RULE INDUCTION

(75) Inventors: Ramesh Agarwal, Yorktown Heights, NY (US); Mahesh V. Joshi, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 506 days.

(21) Appl. No.: 09/823,140

(22) Filed: Mar. 30, 2001

(65) Prior Publication Data

US 2002/0184181 A1 Dec. 5, 2002

(51) Int. Cl.⁷ .......................... G06F 17/00; G06F 15/18
(52) U.S. Cl. .......................................... 706/47; 706/21
(58) Field of Search ..................................... 706/47, 21

(56) References Cited

U.S. PATENT DOCUMENTS

| 4,754,410 A | * | 6/1988 | Leech et al. .................. 706/45 |
| 2001/0023419 A1 | * | 9/2001 | Lapointe et al. .............. 706/15 |

OTHER PUBLICATIONS

Machine Learning, "Proceedings of the 12th International Conference", William W. Cohen, 1995.*
John et al., "Building Long /Short prortfolios Using Rule Induction", Proceeding of the IEEE/IAFE Conference on Computational , Intelligence for Financial Engineering, Mar. 1996.*

Weiss et al., "Optimized Rule Induction", IEEE Expert, Dec. 1993.*

Shusaku Tsumoto, "Automated Discovery of Positive and Negative Knowledge in Clinical Databases", IEEE Engineering in Medicine and Biology, Jul./Aug. 2000.*

Cercone et al, "Rule–Induction an Case–Based Reasoning: Hybrid Architectures Appear Advantageous", IEEE Transaction on Knowledge and Data Engineering, Jan./Feb. 1999.*

* cited by examiner

Primary Examiner—George B. Davis
(74) Attorney, Agent, or Firm—F. Chau & Associates, LLC

(57) ABSTRACT

A method for learning signatures of a target class using a sequential covering phased rule-induction. The method balances recall and precision for the target class. A first phase aims for high recall by inducing rules with high support and a reasonable level of accuracy. A second phase improves the precision by learning rules to remove false positives in the collection of the records covered by the first phase rules, while keeping the overall recall at a desirable level. The method constructs a mechanism to assign prediction probability scores to each classification decision. The model includes a set of positive rules that predict presence of the target class, a set of negative rules that predict absence of the target class, and a set of prediction score values corresponding to each pair-wise combination of positive and negative rules. The two-phase method is extensible to a multiphase approach.

20 Claims, 3 Drawing Sheets

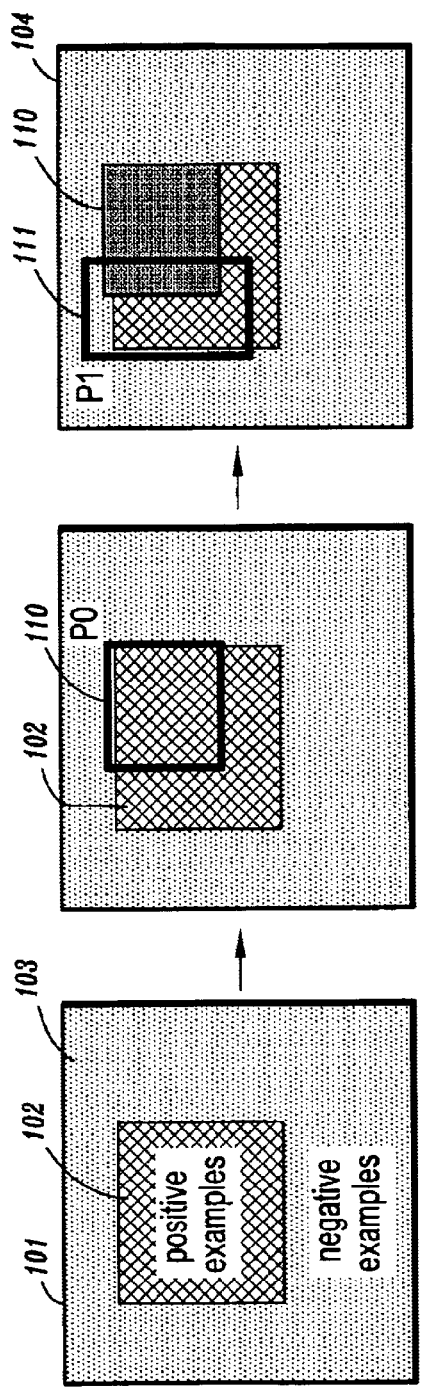
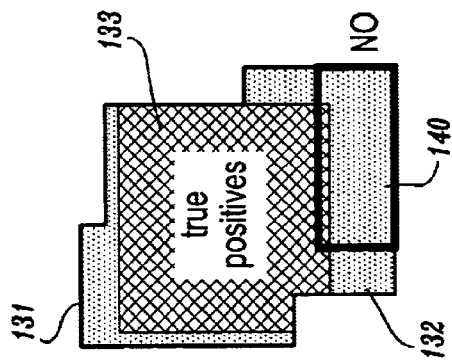
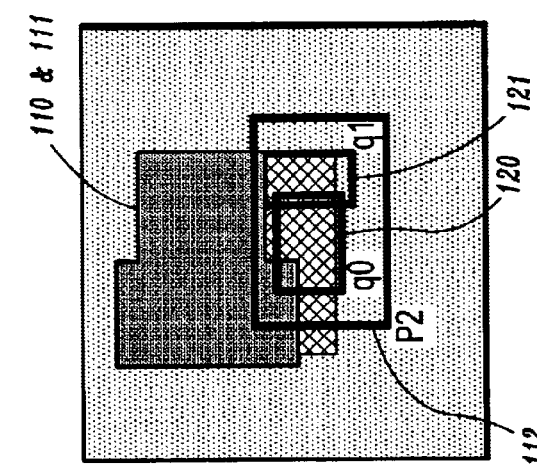
FIG. 1a
FIG. 1b
FIG. 1c
FIG. 1d
FIG. 1e

SupportMatrix

|  | N0 | N1 | N2 | N3 |
|---|---|---|---|---|
| P0 | 0 | 0 | 4 | 100 |
| P1 | 3 | 7 | 5 | 50 |
| P2 | 8 | 5 | 6 | 27 |

ErrorMatrix

|  | N0 | N1 | N2 | N3 |
|---|---|---|---|---|
| P0 | 0 | 0 | 3 | 1 |
| P1 | 1 | 2 | 4 | 4 |
| P2 | 0 | 1 | 2 | 4 |

TruePositiveVariation

|  | N0 | N1 | N2 | N3 |
|---|---|---|---|---|
| P0 | 102 | 102 | 102 | 99 |
| P1 | 53 | 52 | 50 | 46 |
| P2 | 26 | 26 | 25 | 23 |

FalsePositiveVariation

|  | N0 | N1 | N2 | N3 |
|---|---|---|---|---|
| P0 | 2 | 2 | 2 | 1 |
| P1 | 12 | 10 | 5 | 4 |
| P2 | 20 | 12 | 8 | 4 |

AccuracyVariation

|  | N0 | N1 | N2 | N3 |
|---|---|---|---|---|
| P0 | 98.1 | 98.1 | 98.1 | 99.0 |
| P1 | 81.5 | 83.9 | 90.9 | 92.0 |
| P2 | 56.5 | 68.4 | 75.8 | 85.2 |

Parameters:
  MinSupportScore = 5
  MinZ = 3.0

Final Result: ScoreMatrix

|  | N0 | N1 | N2 | N3 |
|---|---|---|---|---|
| P0 | 98.1 | 98.1 | 98.1 | 99.0 |
| P1 | 81.5 | 28.6 | 90.9 | 92.0 |
| P2 | 11.1 | 20.0 | 33.3 | 85.2 |

METHOD FOR BUILDING CLASSIFIER MODELS FOR EVENT CLASSES VIA PHASED RULE INDUCTION

BACKGROUND OF THE INVENTION

1. Field of the Invention

The present invention is related to the field of data mining, more particularly to classifier models and supervised methods of learning same from previous observations, for the purpose of predicting a class or category of newly encountered observations.

2. Discussion of the Prior Art

One problem in data mining is deviation detection. Deviation detection includes modeling rarely occurring phenomena or examples in data. Current work in deviation detection focuses on building classifier models for normal examples and then detecting deviations from the model.

There are many situations wherein rare deviant events may occur, for example, in network intrusion detection or fraud detection. In network intrusion detection, for attacks of type remote-to-local (r2l) on a computer made remotely by guessing a password or opening a ftp data connection, the successful incidents of attack would be rare as compared to the total number of r2l connections.

Classification is a supervised technique in data mining that learns models from labeled data (known data). Input to the classification problem is a set of observations from the real world that are recorded as a set of records, each characterized by multiple attributes. Associated with each record is a categorical attribute called a class. Given a training set of records with known class labels, one problem is to learn a model for the class in terms of other attributes.

In prior art systems, the objective has been to maximize accuracy, thus, minimizing the number of misclassifications. However, for rare classes, a mere accuracy metric is not sufficient. Consider evaluation data in which 1% of the examples belong to a rare target class; if the classifier predicts that every example belongs to a class other than the target class, then it achieves an accuracy of 99%, which is acceptable for many existing techniques. However, from the perspective of predicting rare target class examples, its performance is unacceptable because it may not have predicted any rare target examples correctly. Existing methods of learning rule-based models may fail to learn complete and precise models for rare target classes.

Disjunctive Normal Form (DNF) is the most general form of a rule-based model. The model for a given class C, is of the form R: D1 OR D2 . . . OR Dn→C, where each Di is called a disjunct, and is formed by conjunction of multiple conditions on attributes of the record, such as D1:(a1=P) AND (a2<10), where a1 and a2 are attributes of unordered and ordered types, respectively, and P is one of the specific values taken by a1. There are two broad categories of methods of learning a DNF model: specific-to-general and general-to-specific. Specific-to-general techniques start with each record as the most specific rule, and progressively generalize the rule-set by merging or removing individual conditions and rules. However, these techniques are not usually suitable for problems with large high-dimensional data-sets because their time complexity scales poorly (e.g., quadratic in training set size and cubic in number of attributes).

General-to-specific techniques begin with the most general rule, an empty rule, and progressively add specific conditions to it. General-to-specific techniques found widespread use because of their competitive performance and computational tractability in practice. General-to-specific techniques use a method of sequential covering that iteratively discovers multiple disjuncts (D1 then D2 then D3, and so on). Every time a rule is learned, the examples supported by it are removed before the next iteration. Thus, after D1 is discovered, records where its antecedent is true are removed.

Existing techniques strive for the accuracy of each disjunct with respect to the predicted target class. Each disjunct is expected to cover a disjoint signature of the target class. If all signatures of the target class are pure, such that each signature covers very few negative examples (i.e. examples not of the target class), then this approach may produce satisfactory results.

However, there are several situations in which a sequential covering method of discovering high accuracy disjuncts may fail. For example, when the target class signature is composed of two components, presence of the target class and absence of the non-target-class, and the later component is not correctly or completely learned. This can happen, especially for rare classes, when a signature for the presence of the class is inherently impure by itself. For example, in intrusion detection, for a rare attack type r2l, a signature for the presence of an example might be connection_type=ftp. However, this will also cover ftp connections made to flood the computer in a denial-of-service (dos) attack. Thus, the rule for r2l has to be refined by detecting signatures for the absence of dos attacks.

In many existing techniques, accuracy constraints cause each rule to be refined immediately by adding more conjunctive conditions that detect a second component. However, individual rules may not cover a sufficient number of negative examples needed for learning desirable signatures, leading to splintered false positives.

Another problem in existing sequential-covering methods is small disjuncts, in which are rules that cover a small number of target class examples, typically less than about 1 or 2 percent of the target class, are more prone to generalization error than rules covering a larger number of such examples. For prevalent classes, such rules usually arise in the later iterations of the method, because the remainder dataset includes a small number of target class examples to learn from. However, for rare classes, such rules may appear very early in the method because the total number of target class examples is relatively small.

Small disjuncts are manifested in existing techniques, because of the constraints on the accuracy of each rule. The constraints result in low overall support for the rule. From statistical point of view, decisions made with small evidential support are often unreliable.

Therefore a need exists for a system and method to overcome splintered false positives and small disjuncts, having the ability to learn complete and precise classifier models for target classes including rare examples.

SUMMARY OF THE INVENTION

According to an embodiment of the present invention, a program storage device is provided readable by machine, tangibly embodying a program of instructions executable by the machine to perform method steps for predicting a target class within a dataset. The method includes predicting the presence of a plurality of examples of the target class, and predicting the absence of the target class among the plurality of examples predicted to have presence of the target class.

The method further includes weighing an effect of each absence prediction on each presence prediction.

The target class includes less than three percent of the examples in the dataset. The target class includes less than two percent of the examples in the dataset.

The method includes evaluating the presence prediction and the absence prediction according to the equation:

$$F = 2 * recall * precision / (recall + precision)$$

wherein F is a balance between recall and precision. The recall is a predefined fraction of the examples among all target class examples. The precision is a predefined fraction of correctly predicted target class examples among all predicted examples.

According to an embodiment of the present invention, a method is provided for learning a classifier model which determines examples of a target class in a dataset. The method includes learning a plurality of positive rules supporting a plurality of examples of the target class, learning a plurality of negative rules removing a plurality of false positive examples among the examples supported by the positive rules, and weighing an effect of each negative rule on each positive rule.

The presence prediction achieves at least a predefined recall and the absence prediction achieves at least a predefined precision. Achieving the desired precision includes collecting the examples predicted by the presence prediction, andpredicting a false positive example among the examples predicted by the presence prediction.

The positive rules are learned iteratively, the positive rules satisfying a predefined criterion for a parameter of the classifier model. The parameter is one of MinSupFractionP, MinCoverageP, and MinAccuraryP.

Learning the negative rules further includes determining a contribution of each negative rule, and comparing each contribution to a predefined description length, upon determining that the contribution is greater than the description length, ending the learning of negative rules.

A weight of each effect corresponds to a probability of a given supported example belonging to the target class. A negative rule/positive rule combination having a low weight is ignored by the classifier model.

According to an embodiment of the present invention, a method for learning a classifier model is provided which predicts the presence of a target class in a dataset. The method includes learning a plurality of P-Rules supporting a plurality of examples of the target class, learning a plurality of N-Rules removing a plurality of false positive examples among the examples supported by the P-Rules, and assigning a probabilistic score to each N-Rule/P-Rule combination.

Learning P-Rules further includes learning a plurality of P-Rules individual supporting at least a first predefined number of examples and collectively supporting at least a second predefined number of examples, learning a plurality of P-Rules having at least a predefined accuracy upon determining that the second predefined number of examples are supported, and learning the N-Rules upon determining that a subsequent P-Rule has an accuracy less than a predefined accuracy.

Learning the negative rules includes determining a cost for an N-Rule, and comparing the cost to a predefined description length, upon determining that the cost is greater than the description length, ending the learning of N-Rules.

Learning the P-Rules is via sequential covering. Learning the N-Rules is via sequential covering.

BRIEF DESCRIPTION OF THE DRAWINGS

Preferred embodiments of the present invention will be described below in more detail, with reference to the accompanying drawings:

FIG. 1(a) shown the example training set;

FIG. 1(b) shows the picture of the training data after first P-Rule is discovered;

FIG. 1(c) shows the picture after second P-Rule is discovered on remaining examples;

FIG. 1(d) illustrates that the method chooses high support, low accuracy rule P2 over low support, high accuracy rules q1 or q2;

FIG. 1(e) shows the dataset for second phase formed by collecting all the examples supported by P-Rules;

DETAILED DESCRIPTION OF PREFERRED EMBODIMENTS

The present invention teaches methods related to data mining, and in particular methods for the supervised learning of models which classify rarely occurring target class examples. Within any data, rare events have unique signatures which can be extracted. A classification model needs to be built for rare targets from a relatively small fraction of available target class examples.

The present invention assumes an F-measure rather than a classification accuracy as a metric for determining the effectiveness of a classification method. A two-phase rule induction method (TPRI) is implemented to achieve a high value for the F-measure. The F-measure reflects a balance between a level of recall and a level of precision. A system implementing the methods according to the present invention learns a binary rule-based classifier model for each target class. The model is represented using two types of rules: P-Rules that predict the presence of the target class and N-Rules that predict absence of the target class.

Figure 2:
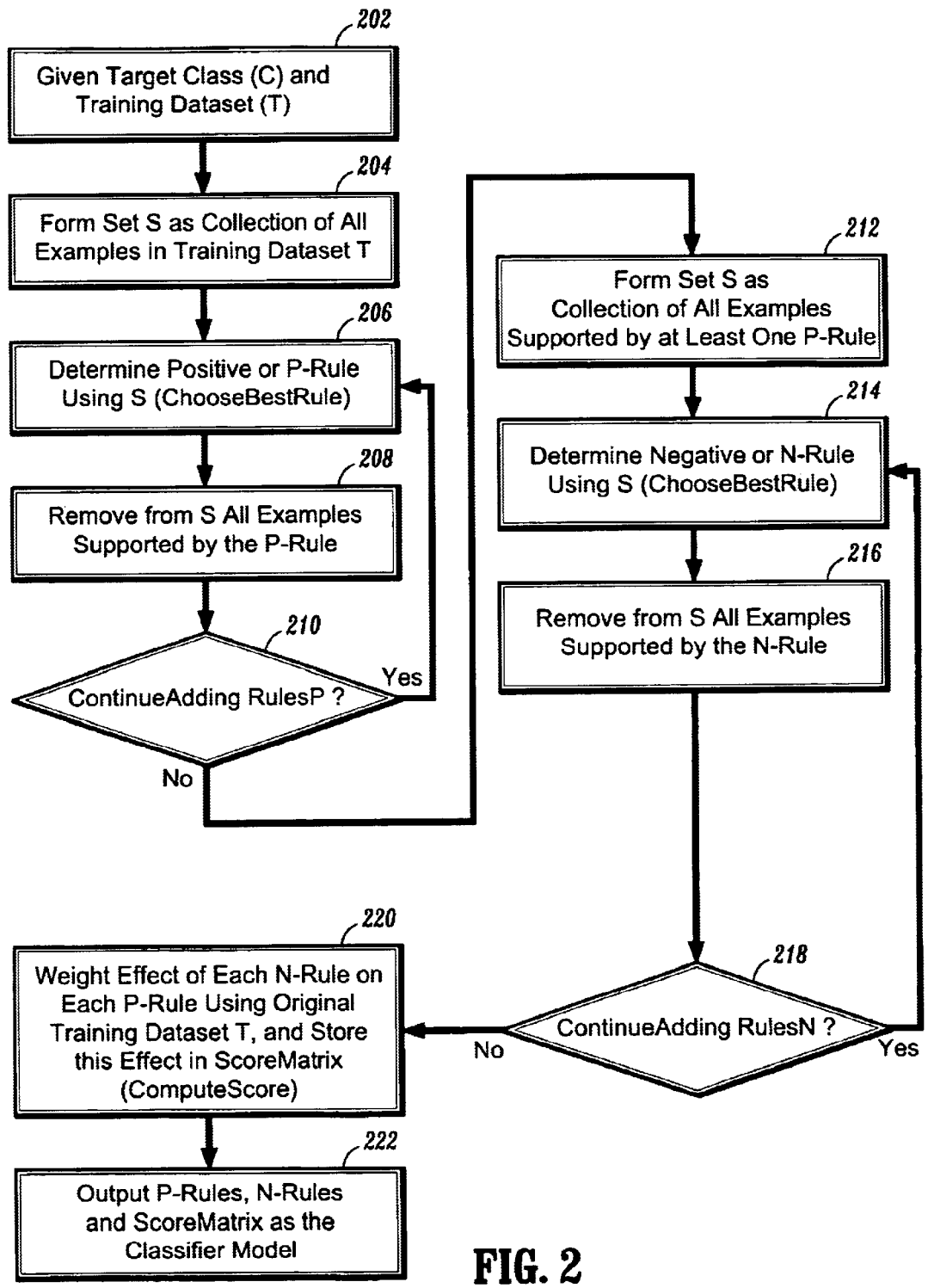
FIG. 2 is a flow diagram of a two-phase classifier method according to an embodiment of the present invention.

Referring to FIG. 2, according to an embodiment of the present invention, the learning method includes two phases. A first phase learns P-Rules using a sequential covering strategy in blocks 206–210. Initially the first phase focuses on learning rules with high support and high accuracy. However, later when a high accuracy rule cannot be found in combination with sufficient support, unlike any existing method, the first phase selects a rule with higher support and lower accuracy over a rule with high accuracy and low support. Choosing a rule with high support ensures the statistical significance of each rule learned or discovered. Thus, the method seeks a high recall during the first phase. The preference given to high support/low accuracy rules in the later part of the first phase may reduce the overall precision of the P-Rules.

A second phase of the learning method regains the loss in precision. The second phase collects all the examples, true positives and false positives, for which at least one of the P-Rules applies in block 212. N-Rules are then learned based on this collection of examples to predict the absence of the target class in the data, thereby removing false positives, in blocks 214–218.

There are at least two advantages to having at least a second learning phase. The addition of a second phase allows the first phase to be less sensitive to erroneous small disjuncts. An embodiment of the present invention proposes a solution to the problem of splintered false positives that existing techniques may face. The second phase of the method predicts the absence of target class examples from the combined set of examples supported by the first phase rules, including any false positives, thus enabling the present invention to remove false positives more efficiently than prior art single phase methods.

After the two phases are completed, the method builds a score matrix in block 220. The score matrix is used to assign a probabilistic score to each prediction made by a classifier. The classifier analyzes the effect of each N-Rule on each P-Rule and shields the method against the effects of overfitting the model to the training data. The score matrix has one entry for each P-Rule/N-Rule combination and entries for examples when a P-Rule applies but no N-Rule applies.

The two-phase method can be extended into a multi-phase method, wherein P-Rules and N-Rules are alternatively discovered on subsets of the original training data which become progressively purer in the target class. The non-target class is an impurity that is reduced progressively, thus increasing the concentration of the desired target class. For the multi-phase approach, each time a phase completes, all the records covered collectively by the rules discovered in that phase may be used to begin the new phase. The increase in the desired purity of the target class (recall and precision) may be monitored to decide when to stop the method. A score matrix, similar to the two-phase method, where the number of dimensions is equal to the number of phases may also provided.

The present invention uses an evaluation metric that achieves a balance between two metrics specific to the given target class: recall and precision. Given N different evaluation cases which are known to have M examples of target class C, the recall metric indicates how many of these M examples the classifier predicts correctly and the precision metric indicates how many of the total examples predicted to be of class C are of class C. F-measure, defined as:

2*Recall*Precision/(Recall+Precision)

The F-measure metric measures the balance between recall and precision. Often there is a tradeoff between achieving good recall and good precision. The value of the F-measure increases with the values for recall and precision. A classifier model with a high F-measure can be said to have learned a complete and precise model of the target class.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the method steps) may differ depending upon the manner in which the present invention is programmed. Given the teachings of the present invention provided herein, one of ordinary skill in the related art will be able to contemplate these and similar implementations or configurations of the present invention.

A: Conceptual Illustration of Learning Method

Referring to FIG. 2, consider a binary classification problem, where a training dataset T and target class C form an input 202. For a rule R:A→C (A being a conjunction of conditions formed by different attributes and their values), let S denote a subset of T where R applies 204; i.e. where A is true. Let SC denote the subset of S where the class label is C. Support of the rule, $s_R$ is defined as $|S|/|T|$ ($|S|$ denotes the cardinality of set S). Accuracy of the rule $a_R$ is defined as $|SC|/|S|$.

Given these definitions, the method is illustrated in FIG. 1. FIG. 1a shows the entire training dataset, among which the target class is distributed 101 and 202, including positive and negative examples. The method may be considered in two phases. A first phase starts with the entire training dataset 101 including positive examples 102 and negative examples 103. The phase finds a rule, P0 110, that has a desired combination of support and accuracy. As FIG. 1b shows, P0 110 covers about one half of the positive examples 102 and a portion of the negative examples 103. By removing the examples supported by P0 110, and repeating the method on the remaining dataset 104 as shown in FIG. 1c, let P1 111 be found on this dataset 104. P1 111 covers examples, positive and negative, and has a support level and accuracy level which is lower than P0 110. As the method continues, it becomes increasingly difficult to find rules that have high support and high accuracy. In such cases, a preference is given to the support level as illustrated in FIG. 1d, where P2 112 is preferred over q0 120 or q1 121. The method ends when at least a predefined portion of the target class example is supported, for example, greater than 95% of the positive examples 102. If the method were to continue, the additional rules would have lower accuracies to the point where the accuracies would be undesirable. If an accuracy threshold is set lower, the method may proceed beyond P2 112 to cover additional positive examples.

Due to the preference for support in later iterations, some negative examples 103 may be supported, which can be referred to as false positives 131 and 132. These are shown as the shaded area in FIG. 1(e).

Referring to FIG. 2, the method collects all the examples supported by the P-Rules 212 and learns N-Rules 214, which remove the false positives from the examples included by the P-Rules, thereby increasing the precision of the P-Rules.

Referring to FIG. 1(e), on a dataset including records supported by the union of the P-Rules 131–133, the method begins an inverse learning method. The new target class is now the absence of original target class. The starting dataset 131–133 is shown as a restricted subset of the original dataset 101 from FIG. 1a.

The method determines a first N-Rule, N0 140. Each N-Rule determines and removes false positive examples of the original target class. The N-Rule, N0 140, like P0 110, has a relatively high accuracy. After learning a first N-Rule, examples supported by the first N-Rule are removed. Iterations progress similarly to the method of the first phase.

For purposes of the present invention, the levels of accuracy and support which are deemed desirable or high are dependent on the nature of the training data. A high level of support reflects the capture of a large portion of the remaining positive examples of the target class. Similarly, a desirable accuracy avoids the capture of a large portion of the remaining negative examples of the target class. For example, for training data in which the target class comprises 5% of the data, a high accuracy may be greater than 25% while a high support level may be greater than 10%. However, it is obvious that the desirable or high levels of accuracy and support may be variable, and different levels may be used without departing from the scope or spirit of the present invention.

A 100% accurate rule in the second phase strictly removes the false positives supported by the P-Rules in the first phase. While an N-Rule with less than 100% accuracy removes some of the true positive examples of the original target class (that were captured in the first phase). The removal of true positives by an N-Rule produces a false negative.

For both P and N-Rules, higher accuracy and support rules are learned or discovered first. The rules are ranked in the order they are learned. At the end of the two-phase method, a majority of the positive examples of the dataset are captured along with few of the negative examples (false positives). The supported false positives may be attributed to the lower accuracy P-Rules. Similarly, false negatives may be attributed to the lower accuracy N-Rules.

Based on these observations, a scoring method 220 is provided to recover some of the false negatives that may have been introduced by the N-Rules, and in particular low ranked N-Rules. The scoring method is also provided to assign low scores to examples supported by low accuracy P-Rules. Note that the scoring method allows the classifier learning method to be aggressive, having a low threshold for the final accuracy in each of the phases. The Learning method creates a classifier model based on the learned P-Rules, N-Rules, and the ScoreMatrix 222.

B: Main Learning Method and Model Format

The pseudo-code of a method for learning a binary classifier model is given in Appendix 1. Referring to FIG. 2, the details of subroutines ChooseBestRule, blocks 206 and 214, and ComputeScores, block 220, are given in the following subsections. The method is parameterized by input parameters which give a user control over some options. These options relate to decisions that determine the performance of the classifier. For example, the following parameters may be supported:

MinSupFractionP: Each rule discovered in the P-phase must support at least MinSupFractionP*ntc number of examples, where ntc is the number of target class examples in original training dataset set.

MinCoverageP: Collectively, all P-Rules must cover at least MinCoverageP number of positive examples of target class.

MinAccuracyP: Each rule discovered in the first P-phase must have an accuracy of at least MinAccuracyP.

Stopping criterion in P-phase (ContinueAddingRulesP), block 210, FIG. 2: Currently P-Rules are added until the MinCoverageP criterion is met, and after it is met a new rule is added only if it satisfies the MinAccuracyP constraint. Additional criteria would be obvious to one skilled in the art.

Stopping criterion in N-phase (ContinueAddingRulesN), block 218, FIG. 2: N-Rules are added until the Description Length of the set of N-Rules obtained by adding the new rule does not increase beyond a pre-specified limit over the minimum description length obtained so far. Description length is defined as the cost of encoding the rule-set plus the cost of encoding errors in the data given the rule-set.

Rule evaluation metric, and refinement stopping criteria for P-phase and N-phase: These are explained in section C, where the method of building individual rules is explained.

MinSupportScore and MinZ: These parameters are used to build the scoring method. They are explained in section D.

ScoreThreshold: TPRI assigns score to each decision it makes. If a decision's score is greater than ScoreThreshold, then it is regarded as a positive decision for the target-class.

In the absence of a scoring method, ComputeScores, the model will simply mean that, if some P-Rule applies and no N-Rule applies to a record, then the record belongs to the target class. Formally, this means that for the two-phase model with n P-Rules and k N-Rules, the two phase model is of the form C=(P1 or P2 or . . . or Pn) and (not N1) and (not N2) and . . . and (not Nk)

This is equivalent to a DNF model of the form

C=(P1 and (not N1) and (not N2) and . . . and (not Nk))
or
(P2 and (not N1) and (not N2) and . . . and (not Nk))
or . . . or
(Pn and (not N1) and (not N2) and . . . and (not Nk))

As can be seen, the model is restrictive in the sense that all the conjunctions have all but one condition in common. While this may restrict the kinds of functions that can be learned using the model, as shown in section D, the scoring method allows the method to relax the restriction by selectively ignoring the effects of certain Nj N-Rules on a given Pi P-Rule.

C: Choosing and Evaluating Rules

Referring to FIG. 2, the ChooseBestRule subroutine (blocks 206 and 214), is called from the main method. An example of ChooseBestRule is given in Appendix 2. A rule is built by adding one conjunctive condition per refining iteration of the subroutine. For each iteration, multiple candidate conditions are evaluated using an EvaluationMetric and the candidate having a highest value for the metric is chosen as the conjunctive condition. The candidate conditions used for categorical attributes are based on a single value of the attribute. However, it is possible to consider subset-valued conditions on categorical attributes. For numerical attributes, three different kinds of candidate conditions are evaluated: two one-sided conditions, $A \leq v$ and $A > v$, and a range-based condition, $vl < A \leq vr$. The values of vl and vr are computed by doing an extra scan of the sorted set S. This is described in the method. The correctness of the method has been verified through experimentation.

One of the parameters in the ChooseBestRule is the EvaluationMetric. The EvaluationMetric determines which conditions are to be added to a rule. EvaluationMetric captures a distinguishing capability of a rule with respect to the target class by combining the support of the rule and accuracy of the rule. A rule with a higher EvaluationMetric implies that it is statistically more significant in capturing the target class. The following EvaluationMetric is implemented in the one version of the TPRI, however other metrics can also be used. For example, gini index, information gain, gain-ratio, and chi-squared statistics.

Z-number: Let $a_R$ denote the accuracy of a given rule, R, and $s_R$ denote its support. Refer to the beginning of section A for definitions. Let $a_C$ denote the mean of target class C, defined as $a_C = |S_C|/|S|$, where S is the current training data set, and $S_C$ is the subset of S where C is true. Let $\sigma_C$ denote the standard deviation of target class C. For the binary problem under consideration, $\sigma_C = \sqrt{a_C(1-a_C)}$. Using these notations, Z-number is defined as $$Z_R = \sqrt{s_R}(a_R - a_C)/\sigma_C$$

EvaluationMetric measures how many standard deviations separate the mean of the rule and the mean of the target class. The greater the separation, the better can R distinguish examples of class C. Weighing the separation gives greater weight to the high support rules. Z-number is similar to the z-test or t-test from statistics, depending on the value of $s_R$.

ChooseBestRule also includes a criterion which stops the refinement or growth of a rule (ContinueRefining function). In one embodiment of the TPRI, different criteria for P-phase and N-phase are used. Let current rule be R and the refined rule be R1. The method determines whether to accept R1 or to stop at R. R1 is a more specific version of R, so its accuracy is greater than or equal to that of R. The support for R1 is less than or equal to that of R. Based on the accuracy and support of R and R1 the method finds the values of EvaluationMetric for both rules with respect to the distribution of the target class in the entire dataset S, that is supplied as the input to ChooseBestRule. For the first phase (determine P-Rules), R1 is accepted if its EvaluationMetric value is greater than that of R and the MinSupFractionP (described in section B) is satisfied. For the second phase (determine N-Rules), the method allows a rule to grow until R1 determines at least one false positive example of the original target class and supports at least one less true positive example of the original target class as compared to R.

D: TPRI Classification Strategy and Scoring Method

As indicated in section A, P-Rules and N-Rules are arranged in decreasing order of significance, which is same as the order of discovery. Given a record including attribute-value pairs, the classifier applies the P-Rules in ranked order. If no P-Rule applies, prediction is False. The first P-Rule that applies is accepted, and then the N-Rules are applied in ranked order. The first N-Rule that applies is accepted. A default last N-Rule applies when none of the discovered N-Rules apply. If the classifier model makes a True-False decision, then a record is predicted to be True only when some P-Rule applies and no N-Rule applies. However, this is not useful in practice, especially when binary models learned by the TPRI are needed in the multi-class classification problems, where a need may arise to resolve conflicts between True decisions of multiple classifiers. Thus, a mechanism for assigning a score to each decision is needed. Depending on which P-Rule and N-Rule combination applies, the record is predicted to be True with certain score in the interval (0%,100%). This score can be interpreted as the probability of the given record belonging to the target class. In binary classification scenario, a user supplies a parameter ScoreThreshold; if the score for the given record is greater than this threshold, then the record is predicted to belong to the target class.

Each classifier model determines the scores to assign to each P-Rule/N-Rule combination. The scoring method weighs the effect of each N-Rule on each P-Rule. An example of the method is given in Appendix 3. Remember that the N-Rules were learned on a set of records collectively covered by the P-Rules. Thus, each N-Rule is significant in removing the collective false positives. However, a given N-Rule may be effective in removing false positives of only a subset of P-Rules. Moreover, a low accuracy N-Rule may introduce false negatives for a P-Rule, possibly because its primary contribution is to remove false positives of other lower accuracy P-Rules. Such false negatives can be recovered by assigning them a correspondingly low score. Thus, the method needs to determine the significance of each N-Rule for each P-Rule.

Figure 3:
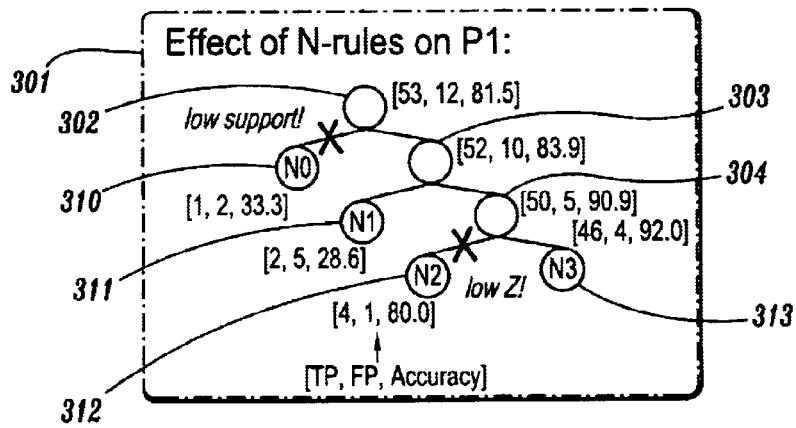
FIG. 3 is an illustration the construction of a Scoring Mechanism (ScoreMatrix) according to an embodiment of the present invention.

The scoring method, CompueScores block 220, builds a SupportMatrix and an ErrorMatrix as shown in Appendix 3. In SupportMatrix, entry (i,j) [j<$n_N$] gives the number of records for which the true predictions made by P-Rule $P_i$ were converted to false by N-Rule $N_j$. Last entry in row i, SupportMatrix (i,$n_N$) gives the number of records where $P_i$ applied but no N-Rule applied. The ErrorMatrix reflects the prediction errors made by each ($P_i$,$N_j$) combination. Entries ErrorMatrix (i,j) [j<$n_N$] give false negatives introduced by $N_j$ for predictions made by $P_i$, whereas ErrorMatrix (i,$n_N$) gives the number of false positives of $P_i$ that none of the N-Rules was able to remove. The last column effectively corresponds to a rule which states "no N-Rule applies". An example of SupportMatrix and ErrorMatrix is shown in FIG. 3. The entries for [P1,N1] in both matrices imply that among the records of training dataset covered by rule P1, rule N1 applied to 7 records (SupportMatrix[P1,N1]), out of which its decision to remove false positives was wrong for 2 records (ErrorMatrix[P1,N1]). This means that it removed 5 false positives of P1, and introduced 2 false negatives for P1.

Using the SupportMatrix and ErrorMatrix, a ScoreMatrix (i,j) [j<$n_N$], gives a score to the record for which both P-Rule $P_i$ and N-Rule $N_j$ apply. ScoreMatrix(i,$n_N$) gives a score when P-Rule applies and no N-Rule applies. For example, the method given in Appendix 3 may be used to arrive at this ScoreMatrix.

Referring to FIG. 3, the matrices TruePositiveVariation, FalsePositiveVariation, and AccuracyMatrix are constructed. Upon the discovery of a P-Rule in the first phase, the P-Rule captures positive examples (True Positives, or TP) and negative examples (False Positives, or FP). Together these examples give the rule its initial accuracy, TP/(TP+FP). As N-Rules are applied successively, the accuracy varies depending on how many false positives are removed and how many false negatives are introduced by each N-Rule. These variations are reflected in the three matrices.

The matrices can be understood better via a decision tree for each P-Rule. FIG. 3 shows a decision tree 301 for rule P1. The root node 302 has all the records where P1 applies. There are sixty-five such records for P1, out of which fifty-three are TPs and twelve are FPs (accuracy of 81.5%). Out of these records, N-Rule N0 310 applies to three records (one TP, two FP). The significance of N0 310 specific to P1 is determined by applying the first criterion, which states that support of any decision should satisfy a MinSupportScore threshold. For example, for a threshold of five, N0 310 has statistically insignificant support (three is less than five), and N0's affect on P1 are ignored. The decision is reflected in the ScoreMatrix by assigning the accuracy of the root node 302 to the [P1,N0] location (81.5%). The method recalculates the TP, FP, and Accuracy statistics for the records where N0 310 did not apply. The statistics of root node 302 cannot propagate to node B 303, even though N0's affect on P1 is ignored. The reason is the sequential covering nature of the way N-Rules are learned, which implies that the decisions made by rule N1 311 (and later rules) are significant only to the population of records where rule N0 310 does not apply.

When N1 311 is applied to the new set of records (fifty-two TP, ten FP), N1 311 applies to seven of those (two TP, five FP). It satisfies the support criterion of significance (≧MinSupportScore). The Z-number of N1 with respect to P1 is calculated according to the formula:

$$Z_N = \sqrt{n_P}(a_N - a_P)/\sigma_P$$

where $n_P$ is the support of parent node (TP+FP). $a_N$ and $a_P$ are accuracies of N-rule's node and parent, respectively, and $\sigma_P = \sqrt{a_P(1-a_P)}$ is the standard deviation of parent's population. A second criterion of significance states that if the absolute value of $Z_N$ is sufficiently high ($\geq$MinZ), then the decision made by the N-Rule is significant with respect to the given P-Rule. This test is similar to the z-test or t-test from statistics (depending on the value of $n_P$). Each N-Rule has a significant Z-number when it was discovered in the learning method because it was computed over a collection of records covered by all P-Rules. The significance of the N-rule specific to a given P-Rule is determined using the above stated formula for $Z_N$. In the example, P1-specific |Z| value of N1 311 is high (11.85$\geq$MinZ=3.0), thus, it is determined that N1's affect on P1 is significant. The decision is reflected in the ScoreMatrix by assigning the accuracy of N1's node 311 to the [P1,N1] location (28.6%). Thus, whenever N1 311 applies to a example predicted true by P1, the probability of that example belonging to the target class is only 28.6%.

The method continues for N2 312, where it is determined that N2's decision has significant support, but it does not have sufficient distinguishing capability with respect to P1 (low |Z|). Hence, N2's affect on P1 is ignored. The accuracy of N2's parent (90.9%) 304 is assigned to ScoreMatrix [P1,N2]. When no N-Rule applies, the accuracy of N3's node 313 is assigned to the last location in P1's row (92.0%). This method is repeated for P0 and P2.

At every node of the decision tree, it is determined whether a N-Rule is significant with respect to the given P-Rule. If it is significant, the accuracy of the N-Rule is used to score the decision, or else the accuracy of its parent is used. It can be verified that for P0, none of the N-Rules have statistically significant support, and for P2, every N-Rule is significant (support and the Z criterion).

E: Additional Features of the Scoring Method

If the support of any node falls below MinSupportScore, the effect of the node is ignored, and the node is assigned the score of its nearest ancestor having statistically significant support.

A perfect decision is not be allowed at any node. A score of 100% is adjusted to n/(n+1) where n=TP, whereas a score of 0% is adjusted to 1/(n+1), where n=FP. This lowers the importance of perfect decisions made on small population as compared to the perfect decisions made on larger population.

In addition, upon determining a parent node to be perfect (before adjusting scores), the method stops splitting the node further and assigns the adjusted score of the node to all the remaining locations of the corresponding row of the Score-Matrix.

The parameters MinSupportScore and MinZ may be fixed using statistical arguments.

The effect of the scoring method according to the present invention is to selectively ignore effects of certain N-Rules on a given P-Rule. The ScoreMatrix entry (i,j) may reflect an adjusted probability that a record belongs to the target class, if both P-Rule $P_i$ and N-Rule $N_j$ apply to it.

Having described embodiments for a system and method for learning classifier models for rare events, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claims and desired protected by Letters Patent is set forth in the appended claims.

APPENDIX 1

```
C: Target Class
T: Training Set with 1 or 0 as class (1 when class = C, 0 otherwise)
LearnTPRIModel(T, C, <user-supplied-parameters>))
    ##### First Stage (P-Phase): Discover P-rules
    S = T
    TargetClass = C
    n = 0
    Nseed = empty set of records
    do
        n = n + 1
        P_n = ChooseBestRule(S, TargetClass)
        Q = records of S covered by P_n
        Add Q to Nseed
        Remove Q from S
    while(ContinueAddingRulesP(<user-supplied-parameters>))
    ##### Second Stage (N-Phase): Discover N-rules
    S = Nseed
    TargetClass = not C
    k = 0
    do
        k = k + 1
        N_k = ChooseBestRule(S, TargetClass)
        Q = records of S covered by N_k
        Remove Q from S
    while( ContinueAddingRulesN(<user-supplied-parameters>))
    ##### Gather TPRI statistics
    ScoreMatrix = ComputeScores(T, C, P-rules, N-rules,
    MinSupportScore, MinZ)
    Output P-rules P_i(1 ≤ I ≤ n), N-rules N_j(1 ≤ j ≤ k), and
    ScoreMatrix
End
```

APPENDIX 2

```
ChooseBestRule(S, C)
    RF = empty rule;
    while(ContinueRefining(phase,<user-supplied-parameters>)
        S = records in S that are covered by RF
        RS = empty rule-set;
        for each Attribute-type pair (A,type)
            if type is categorical
                for each distinct value, v, of A in S,
                    Form rule R1: RF AND (A = v)
                    Form rule R2: RF AND (A != v)
                    Compute strengths of R1 and R2 on S w.r.t.
                    C . . .
                         . . . using EvaluationMetric
                    Add R1 and R2 to RS along with their
                    strengths
                endfor
            endif
            if type is continuous
                Sort S on A's values
                Find vr to maximize EvaluationMetric for A <= vr . . .
                    . . . on S w.r.t. C
                Find vl to maximize EvaluationMetric for A >vl . . .
                    . . . on S w.r.t C
                if strength of A > vl is more than A <= vr
                    Form rule R1:RF AND A>vl
                    Add R1 to RS along with its strength
                    Scan sorted S to the right of vl, and
                    Find vr that maximizes EvaluationMetric
                    for . . .
                        . . . condition vl < A <= vr
                else
                    Form rule R1:RF AND A <= vr
                    Add R1 to RS along with its strength
                    Scan sorted S to the left of vr, and
                    Find vl that maximizes EvaluationMetric for . . .
                        . . . condition vl <A <= vr
                endif
                Form rule R2:RF AND vl<A<= vr
                Add R2 to RS along with its strength
            endif
        endfor
        sort rules in RS in increasing order of their strength
```

APPENDIX 2-continued

```
        RF = rule with highest strength in RS.
    endwhile
    return RF as the rule to be added
end
```

APPENDIX 3

```
ComputeScores( S, C, P-rules, N-rules, MinSupport, MinZ)
    SupportMatrix(1..n,1..k+1) = 0; ErrorMatrix(1..n,1..k+1) = 0;
    for each record R in S
        for(i = 1;i<n;=i+1)
            if (P-rule P_applies to R)
                for(j = 1;j<k;j= j+1)
                    if(N-rule N_j applies to R)
                        if (class of R is C) ErrorMatrix(i,j) = ErrorMatrix(i,j) + 1;
                        SupportMatrix(i,j) = SupportMatrix(i,j) + 1;
                    endif
                endfor
                if(none of the N-rules applied to R)
                    if(class of R is NOT C) ErrorMatrix(i,k+1) = ErrorMatrix(i,k+1) + 1;
                    SupportMatrix(i,k+1) = SupportMatrix(i,k+1) + 1;
                endif
            endif
        endfor
    endfor
    for(i = 1;i<n ;i = i+1)
        p = SupportMatrix(i,k+1) - ErrorMatrix(i,k+1);
        q = ErrorMatrix(i,k+1);
        TruePositiveVariation(i,k+1) = p; FalsePositiveVariation(i,k+1) q;
        AccuracyVariation(i,k+1) = p/(p +q);
        for(j=k;j>1;j=j-1)
            p = TruePositiveVariation(i,j+1) + ErrorMatrix(i,j);
            q = FalsePositiveVariation(i,j+1) +SupportMatrix(i,j) - ErrorMatrix(i,j);
            TruePositiveVariation(i,j) = p; FalsePositiveVariation(i,j) = q;
            AccuracyVariation(i,j) = p/(p + q;
        endfor
    endfor
    for(i = 1;i<n;i=i+1)
        for(j = 1;j<k;j = j+1)
            if((TruePositiveVariation(i,j) + FalsePositiveVariation(i,j)) < 2* MinSupport)
                Assign AccuracyVariation(i,j-1) to ScoreMatrix(i,m) where j <m<k+1
                Go to next i
            endif
            leftTP = TruePositiveVariation(i,j) - TruePositiveVariation(i,j+1);
            leftFP = FalsePositiveVariation(i,j) - FalsePositiveVariation(i,j+1);
            leftZ = Z-number of left node w.r.t. Parent's distribution
            if(leftTP + leftFP > MinSupport AND |leftZ|>MinZ)
                ScoreMatrix(i,j) = leftTP/(leftTP +leftFP)
            else
                ScoreMatrix(i,j) = AccuracyVariation(i,j)
            endif
        endfor
        ScoreMatrix(i,k+1) = AccuracyVariation(i,k+1)
    endfor
    return ScoreMatrix
end
```

What is claimed is:

1. A program storage device readable by machine, tangibly embodying a program of instructions executable by the machine to perform method steps for predicting a target class within a dataset, the method steps comprising:

determining positive rules predicting the presence of a plurality of examples of the target class;

determining negative rules predicting the absence of the target class among the plurality of examples of the target class predicted to be present; and applying a classifier model to the dataset for determining the presence the target class according to the positive rules and negative rules.

2. The program storage device of claim 1, further comprising the step of weighing an effect of each absence prediction on each presence prediction to recover at least one example of the target class predicted to be absent.

3. The program storage device of claim 1, wherein the target class includes less than three percent of the examples in the dataset.

4. The program storage device of claim 1, wherein the target class includes less than two percent of the examples in the dataset.

5. The program storage device of claim 1, further comprising the step of evaluating he presence prediction and the absence prediction according to the equation:

$$F=2*recall*precision/(recall+precision)$$

wherein F is a balance between recall and precision.

6. The program storage device of claim 5, wherein the recall is a predefined portion of the examples in the target class.

7. The program storage device of claim 5, wherein the precision is a predefined fraction of correctly predicted target class examples among all predicted examples.

8. The program storage device of claim 1, wherein the presence prediction achieves at least a predefined recall and the absence prediction achieves at least a predefined precision.

9. The program storage device of claim 8, wherein achieving the desired precision includes the steps of:
- collecting the examples predicted by the presence prediction; and
- predicting a false positive example among the examples predicted by the presence prediction.

10. A method for learning a classifier model which determines examples of a target class in a dataset comprising the steps of:
- learning a plurality of positive rules supporting a plurality of examples of the target class;
- learning a plurality of negative rules removing a plurality of false positive examples among the examples supported by the positive rules;
- weighing an effect of each negative rule on each positive rule; and
- applying the classifier model to the dataset for determining the presence of the target class according to a plurality of positive rules, the plurality of negative rules, and the effect of each negative rule on each positive rule.

11. The method of claim 10, wherein the positive rules are learned iteratively, the positive rules satisfying a predefined criterion for a parameter of the classifier model.

12. The method of claim 11, wherein the parameter is one of MinSupFractionP, MinCoverageP, and MinAccuraryP.

13. The method of claim 10, wherein the step of learning the negative rules further comprises the steps of:
- determining a contribution of each negative rule; and
- comparing each contribution to a predefined description length, upon determining that the contribution is greater than the description length, ending the learning of negative rules.

14. The method of claim 10, wherein a weight of each effect corresponds to a probability of a given supported example belonging to the target class.

15. The method of claim 10, wherein a negative rule/positive rule combination having a low weight is ignored by the classifier model.

16. A method for learning a classifier model which predicts the presence of a target class in a dataset comprising the steps of:
- learning a plurality of P-Rules supporting a plurality of examples of the target class;
- learning a plurality of N-Rules removing a plurality of false positive examples among the examples supported by the P-Rules;
- assigning a probabilistic score to each N-Rule/P-Rule combination; and
- applying the classifier model to the dataset for determining the presence of the target class according to a plurality of positive rules, the plurality of negative rules, and the probabilistic scores, wherein each probabilistic score is compared to a threshold to recover at least one example of the target class removed by the plurality of N-Rules.

17. The method of claim 16, wherein the step of learning P-Rules further comprises the steps of;
- learning a plurality of P-Rules individual supporting at least a first predefined number of examples and collectively supporting at least a second predefined number of examples;
- learning a plurality of P-Rules having at least a predefined accuracy upon determining that the second predefined number of examples are supported; and
- learning the N-Rules upon determining that a subsequent P-Rule has an accuracy less than a predefined accuracy.

18. The method of claim 16, wherein the step of learning the N-Rules further comprises the steps of:
- determining a cost for an N-Rule; and
- comparing the cost to a predefined description length, upon determining that the cost is greater than the description length, ending the learning of N-Rules.

19. The method of claim 16, wherein the step of learning the P-Rules is via sequential covering.

20. The method of claim 16, wherein the step of learning the N-Rules is via sequential covering.

* * * * *